April 11, 1961　　　　J. B. GILL　　　　2,978,813
SKETCH BOARD
Filed Dec. 22, 1958　　　　　　　　　　　　2 Sheets-Sheet 1

James B. Gill
INVENTOR.

BY *Clarence A. O'Brien*
*and Harvey B. Jacobson*
Attorneys

April 11, 1961

J. B. GILL 2,978,813

SKETCH BOARD

Filed Dec. 22, 1958

James B. Gill
INVENTOR.

BY *Clarence A. O'Brien*
*and Harvey B. Jacobson*
Attorneys

United States Patent Office 2,978,813
Patented Apr. 11, 1961

2,978,813

SKETCH BOARD

James B. Gill, Fort Wayne, Ind.
(331 Tweedwood Drive, New Haven, Ind.)

Filed Dec. 22, 1958, Ser. No. 782,090

2 Claims. (Cl. 33—80)

This invention relates generally to drawing equipment and more particularly to a novel and improved sketch board for facilitating precision drawing.

Though innumerable drawing aids are commercially available, the majority of them do not lend themselves to utilization in the field or on the job. That is, most of the drafting devices commercially available are designed for the draftsman working at his board. Often, considerable time can be saved if an engineer is able to make substantially finished drawings in the field rather than simply free-hand sketches. Accordingly, the principal object of this invention is to provide a simple construction for a sketch board which allows the user to accurately construct angularly related lines.

Though the simplicity of this invention particularly adapts it for utilization as a portable sketch board, it is equally effective when utilized as a drafting machine. By properly utilizing the single movable straightedge, forming a part of the invention, straight lines may be drawn at any desired angle with perfect accuracy. Accordingly, the invention not only finds utilization in the construction of drawings, but may be advantageously employed to solve problems involving vector analysis. That is, the magnitude and direction of a particular vector may be measured and drawn so that the user would easily be able to find a resultant vector. It is therefore a further object of this invention to provide a novel and improved sketch board capable of facilitating the solution of problems involving vector analysis.

It is a further object of this invention to provide a novel and improved sketch board which is easily portable, simple in construction, and inexpensive to manufacture.

The invention contemplates the inclusion of degree indicia to accurately measure angles and length indicia to accurately record magnitudes. In the construction of this invention, a circular base is utilized on which sketch paper is affixed. A top ring is fixed to the base above the base and a bottom ring is affixed to the base below. It is contemplated that the top ring have degree indicia on the circumference thereof. In the construction, the bottom ring, circular base, and top ring are vertically aligned. The outer diameters of the three elements are equal. A pair of C-shaped slides enclose aligned circumferential portions of the top and bottom rings whereby the slides may be slidably retained on the ring. A straightedge having slots therein is supported on the slides and retained thereon by a vertical pin which is fixed to each of the slides. The vertical pins extend through the slots in the straightedge so as to confine the movement of the straightedge relative to the circular base. The straightedge is provided with length indicia thereon. By proper utilization of the straightedge, it may be moved relative to the circular base to form any chord thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
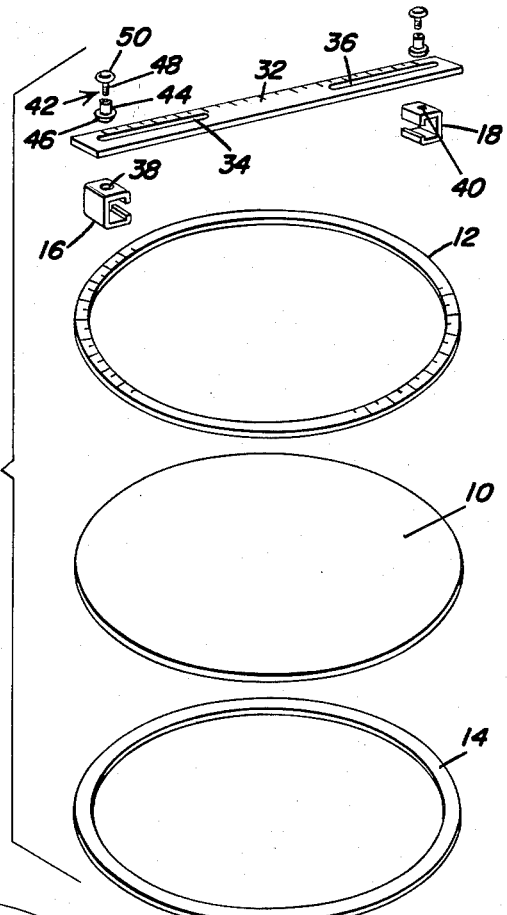
Figure 4 is a disassembled perspective view of the elements comprising this invention.

With continuing reference to the drawings and with initial reference to Figure 4, numeral 10 represents a circular base. The dimensions of the base and material utilized to form the base do not form a significant part of this invention and would be dictated by design considerations. However, it is of course to be noted that the circular base 10 must be flat and have a smooth surface so as to enable a drawing to be made thereon.

Figure 2:
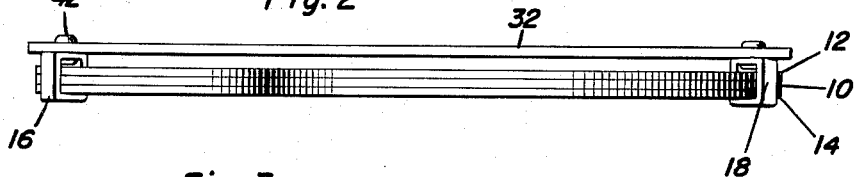
Figure 2 is an elevational side view of the invention.

A top ring 12 is superposed on the circular base 10 and permanently fixed thereto utilizing any satisfactory adhesive. A bottom ring 14 is fixed to the base 10 in the same manner as the top ring 12. As will be apparent, the top ring 12 and bottom ring 14 sandwich the circular base 10 therebetween. As will be particularly noted in Figure 2, the rings 12 and 14 and circular base 10 are vertically aligned and have equal outer diameters. It is further to be noted that the rings 12 and 14 have identical inner diameters.

Figure 3:
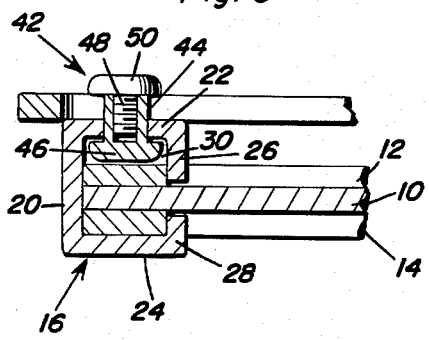
Fig. 3 is an enlarged fragmentary sectional view taken substantially along the plane 3—3 of Figure 1.

A pair of C-shaped slides 16 and 18 are positioned about aligned circumferential portions of the rings 12 and 14 so as to be slidably retained thereon. It will be noted that each of the slides 16 and 18 includes a rear bight portion 20, two forwardly projecting leg portions 22 and 24, and two inwardly projecting leg portions 26 and 28. It will be noted in Figure 3 that the inwardly projecting leg 26 is longer than inwardly projecting leg 28 so as to provide a space 30 between the top ring 12 and forwardly projecting leg 22 of C-slides 16 or 18.

A straightedge 32 having slots 34 and 36 therein is adapted to be supported on the slides 16 and 18. A pair of apertures 38 and 40 are placed in the slides 16 and 18 respectively. A vertically projecting pin 42 extends through the apertures 38 and 40 to retain the straightedge 32 on the slide 16 or 18. More particularly, the pin 42 includes an internally threaded sleeve 44 having a head portion 46 received in the space 30 provided between the upper ring 12 and forwardly projecting leg 22 of C-slides 16 and 18. Threadedly received within the internally threaded sleeve 44 is an externally threaded screw 48 having a headed portion 50. As will be particularly noted in Figure 3, the head 46 of sleeve 44 is accommodated in the space 30 and extends upwardly through the aperture 38 and slot 34. The screw 48 is received in the sleeve 44 while the head 50 of the screw 48 and head 46 of sleeve 44 eliminate the possibility of any vertical movement of the straightedge 32 relative to the slide 16 or 18.

Figure 1:
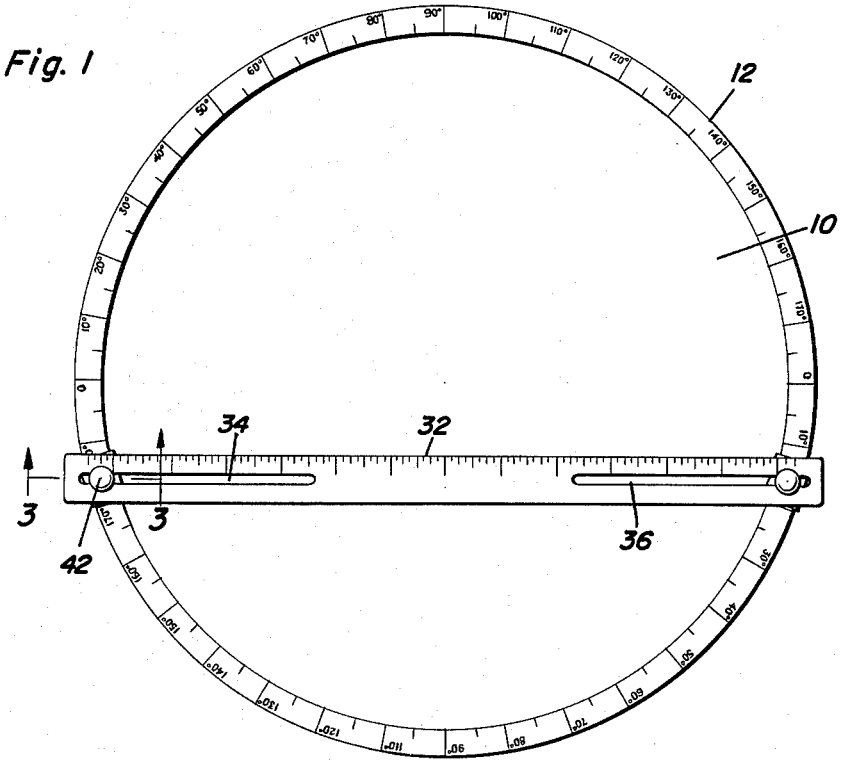
Figure 1 is an elevational plan view of the invention.
Figure 5:
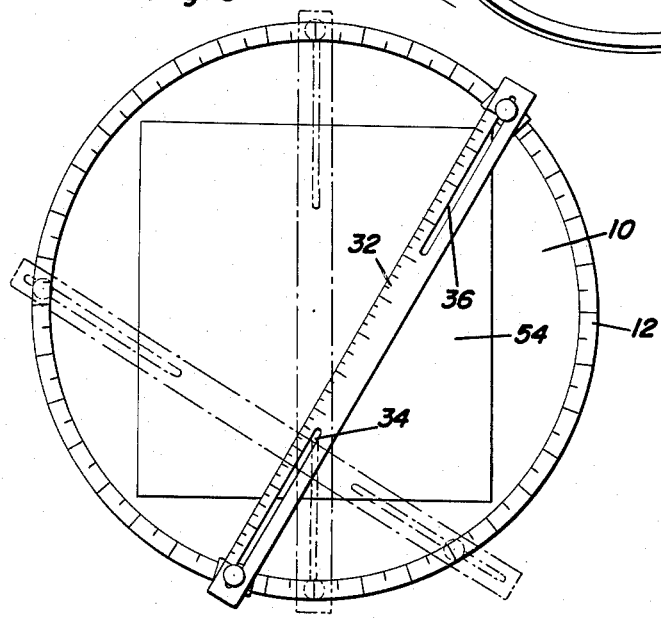
Figure 5 illustrates the invention in operation.

As will be apparent now in Figure 5, by moving the slides 16 and 18 about the circumference of the rings 12 and 14, the straightedge 32 assumes various positions wherein it forms a chord of the circular base 10. Indicia, as illustrated in Figure 1, imprinted on the top ring 12 allows the user to position the straightedge 32 at any desired angle. That is, sketch paper 54 may be affixed to the circular base 10 as by masking tape and by proper orientation of the straightedge 32, a line of any desired angle may be drawn on the paper 54. Further, refinements in this invention would include the establishment of indicia on the circular base 10 for enabling the user to quickly properly orient the paper 54 on the circular base 10. Then, the straightedge 32 may be moved into any of a plurality of positions as illustrated in Figure 5 for making precision drawings. It will be noted that length indicia is imprinted on the straightedge 32 so that lines may be drawn, not only of the right direction but with the proper magnitude. It of course will be apparent to the user that the device is fully capable of producing lines parallel to lines and lines perpendicular to lines with a minimum of effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sketch board for facilitating precision drawing comprising a base, a top ring superposed on said base, degree indicia on said top ring, a straightedge, said straightedge movably supported on said ring forming a chord of said ring, a bottom ring, said bottom ring and said top ring fixed to said base sandwiching said base therebetween, said bottom ring and said top ring having substantially the same inner and outer diameters, said rings being vertically aligned, a pair of C-shaped slides, said slides enclosing aligned circumferential portions of said rings whereby said slides are slidably retained on said rings, an upwardly extending vertical pin fixed to each of said slides, a pair of slots in said straightedge, said pins slidably received in slots.

2. A device for facilitating precision drawing comprising a circular base, a top ring, a bottom ring, said rings fixed to said base sandwiching said base therebetween, said base and said rings having the same outer diameter, a pair of C-shaped slides enclosing said rings slidably retained on said rings, a vertical pin projecting upwardly fixed to each of said slides, a straightedge, said straightedge including a pair of slots, each of said slots slidably receiving one of said vertical pins whereby said straightedge may be moved relative to said base to form any chord thereof, said top ring having degree indicia thereon, each of said vertical pins including a headed internally threaded sleeve and a headed externally threaded screw adapted to be received in said sleeve, and aperture in each of said C-slides, said headed sleeve extending through said aperture, said sleeve head and said screw head preventing said pin from vertical movement.

References Cited in the file of this patent

UNITED STATES PATENTS

| | | |
|---|---|---|
| 224,811 | Wilson | Feb. 24, 1880 |
| 1,755,152 | Parker | Apr. 15, 1930 |
| 2,422,931 | Sachtleber | June 24, 1947 |
| 2,459,216 | Booth | Jan. 18, 1949 |
| 2,717,448 | Lubin et al. | Sept. 13, 1955 |